United States Patent [19]
Schoeberlein

[11] Patent Number: 5,456,041
[45] Date of Patent: Oct. 10, 1995

[54] ADJUSTABLE DEPTH FISHING BOBBER SYSTEM

[76] Inventor: Henry C. Schoeberlein, 408 Bonham Rd., Joppa, Md. 21085

[21] Appl. No.: 314,824
[22] Filed: Sep. 29, 1994
[51] Int. Cl.$^6$ ................................................ A01K 91/02
[52] U.S. Cl. ........................................ 43/44.91; 43/44.92
[58] Field of Search ............................. 43/44.87, 44.89, 43/44.9, 44.91, 44.92, 44.93, 44.95, 4.5, 44.97

[56] References Cited

U.S. PATENT DOCUMENTS

| 2,834,142 | 5/1958 | Saye | 43/44.87 |
| 2,847,792 | 8/1958 | Kuhlmann | 43/44.9 |
| 2,902,792 | 9/1959 | Friday | 43/44.87 |
| 3,392,475 | 7/1968 | Vakousky | 43/44.9 |
| 5,117,576 | 6/1992 | Lasiter | 43/44.91 |
| 5,161,324 | 11/1992 | Dorsey | 43/44.91 |

FOREIGN PATENT DOCUMENTS

| 0170624 | 3/1960 | Sweden | 43/44.87 |

Primary Examiner—Mark Rosenbaum
Assistant Examiner—James Miner

[57] ABSTRACT

An adjustable depth fishing bobber system comprising a bobber stop removably couplable to a fishing line between a user end and weighted fishing hook end thereof. A floatable bobber is disclosed having a top end, a bottom end, a bore disposed therethrough from the top end to the bottom end with the bore further having a central section having an upper end, a lower end, and a diametric extent less than the bobber stop, an upper section extended upwards and outwards from the upper end of the central section to the top end, and a lower section having a diametric extent greater than the central section extended downwards from the lower end of the central section to the bottom end. The system further includes a trap formed of a sheet of flexible material secured across the upper section of the bore thereby defining a holding space between the trap and the upper end of the central section of the bore. The trap having a plurality of slits formed therethrough in a smoked configuration thereby defining an opening generally blocked with plurality of bendable gripping fingers.

3 Claims, 4 Drawing Sheets

PRIOR ART

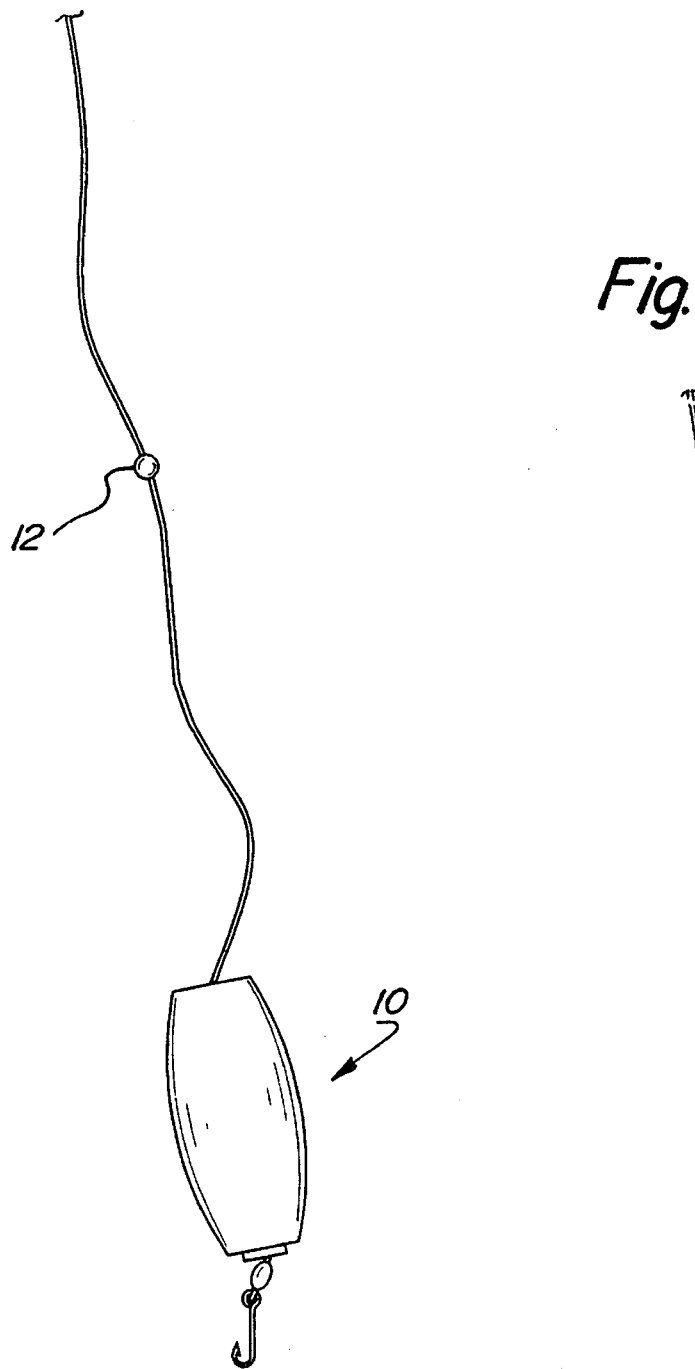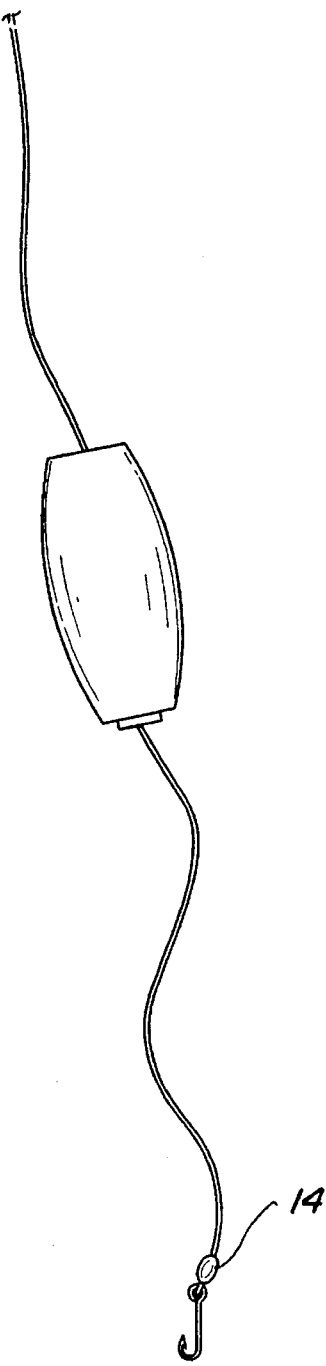
Fig. 3
Fig. 4

ADJUSTABLE DEPTH FISHING BOBBER SYSTEM

BACKGROUND OF THE INVENTION

1. Field of the Invention

The present invention relates to an adjustable depth fishing bobber system and more particularly pertains to allowing a weighted fishing hook end of a fishing line to be readily casted and then set at a predetermined depth within a body of water for fishing with an adjustable depth fishing bobber system.

2. Description of the Prior Art

The use of fishing float systems is known in the prior art. More specifically, fishing float systems heretofore devised and utilized for the purpose of for setting a fishing hook at a depth within a body of water for fishing are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,431,671 to Orenick et al. discloses a casting bobber. U.S. Pat. No. 4,571,874 to Smaw discloses a casting bobber with pre-determined depth setting. U.S. Pat. No. 5,077,928 to Deskevich discloses a fishing line rod bobber. U.S. Pat. No. 5,117,576 to Lasiter discloses an adjustable depth fishing float. U.S. Pat. No. 5,119,578 to Johnson discloses a lighted slip bobber fishing apparatus.

While these devices fulfill their respective, particular objective and requirements, the aforementioned patents do not describe an adjustable depth fishing bobber system that first allows a weighted fishing hook end of a fishing line to be readily casted and then allows the weighted fishing hook end to be set at a predetermined depth within a body of water for fishing.

In this respect, the adjustable depth fishing bobber system according to the present invention substantially departs from the conventional concepts and designs of the prior art, and in doing so provides an apparatus primarily developed for the purpose of use with a fishing line having a user end and a weighted fishing hook end for allowing the weighted fishing hook end to be readily casted and then set at a predetermined depth within a body of water for fishing.

Therefore, it can be appreciated that there exists a continuing need for new and improved adjustable depth fishing bobber system which can be used for use with a fishing line having a user end and a weighted fishing hook end for allowing the weighted fishing hook end to be readily casted and then set at a predetermined depth within a body of water for fishing. In this regard, the present invention substantially fulfills this need.

SUMMARY OF THE INVENTION

In the view of the foregoing disadvantages inherent in the known types of fishing float systems now present in the prior art, the present invention provides an improved adjustable depth fishing bobber system. As such, the general purpose of the present invention, which will be described subsequently in greater detail, is to provide a new and improved adjustable depth fishing bobber system and method which has all the advantages of the prior art and none of the disadvantages.

To attain this, the present invention, used in conjunction with a fishing line having a user end and a weighted fishing hook end, essentially comprises, in combination, a generally spherical bobber stop removably couplable to a fishing line. A bobber formed of styrofoam is included and has a top end, a bottom end, and a concave exterior surface extended therearound between the top end and bottom end. The bobber has an axial bore disposed therethrough from the top end to the bottom end. The bore of the bobber includes a cylindrical central section having an upper end, a lower end, and a diametric extent less than the bobber stop. The bore of the bobber also includes a conical upper section extended upwards and outwards from the upper end of the central section to the top end. Lastly, the bore of the bobber includes a lower section having a diametric extent greater than the central section extended downwards from the lower end of the central section to the bottom end. A generally curved trap formed of a circular sheet of flexible plastic material is included with the trap secured across the upper section of the bore and thereby defining a holding space between it and the upper end of the central section of the bore. The trap has a plurality of slits formed therethrough in a spoked configuration thereby defining an opening generally blocked with plurality of radial bendable gripping fingers. A plurality of casting weights formed of lead are included. Each casting weight has a characteristic weight and a bore disposed therethrough. Each casting weight is removably and frictionally securable within the lower section of the bore of the bobber. One of the casting weights is secured within the lower section of the bore of the bobber at a time. The bobber stop is coupled to a fishing line between the user end and the weighted fishing hook end thereof. The fishing line is extended through the bore of the bobber, through the opening of the trap, and through the bore of casting weight such that the weighted fishing hook end is located below the bottom end of the bobber and the bobber stop is located above the top end of the bobber. The weighted fishing hook end is castable towards a body of water when the bobber is slidably positioned thereagainst. Once the weighted fishing hook is cast upon a body of water, it is further setable for fishing at a predetermined depth within the body of water by sinking until the bobber stop is disposed within the holding space of the floating bobber and generally secured therein with the gripping fingers of the trap.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable depth fishing bobber system which has all the advantages of the prior art fishing float systems and none of the disadvantages.

It is another object of the present invention to provide a new and improved adjustable depth fishing bobber system which may be easily and efficiently manufactured and marketed.

It is a further object of the present invention to provide a new and improved adjustable depth fishing bobber system which is of durable and reliable construction.

An even further object of the present invention is to provide a new and improved adjustable depth fishing bobber system which is susceptible of a low cost of manufacture with regard to both materials and labor, and which accordingly is then susceptible of low prices of sale to the consuming public, thereby making such an adjustable depth fishing bobber system economically available to the buying public.

Still yet another object of the present invention is to provide a new and improved adjustable depth fishing bobber system which provides in the apparatuses and methods of the prior art some of the advantages thereof, while simultaneously overcoming some of the disadvantages normally associated therewith.

Even still another object of the present invention is to provide a new and improved adjustable depth fishing bobber system for use with a fishing line having a user end and a weighted fishing hook end for allowing the weighted fishing hook end to be readily casted and then set at a predetermined depth within a body of water for fishing.

Lastly, it is an object of the present invention to provide a new and improved adjustable depth fishing bobber system comprising a bobber stop removably couplable to a fishing line between a user end and weighted fishing hook end thereof; a floatable bobber having a top end, a bottom end, a bore disposed therethrough from the top end to the bottom end with the bore further having a central section having an upper end, a lower end, and a diametric extent less than the bobber stop, an upper section extended upwards and outwards from the upper end of the central section to the top end, and a lower section having a diametric extent greater than the central section extended downwards from the lower end of the central section to the bottom end; and a trap formed of a sheet of flexible material secured across the upper section of the bore thereby defining a holding space between it and the upper end of the central section of the bore and having a plurality of slits formed therethrough in a spoked configuration thereby defining an opening generally blocked with plurality of bendable gripping fingers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side-elevational view of the preferred embodiment constructed in accordance with the principles of the present invention with the bobber positioned near the weighted fishing hook end of a fishing line for casting.

FIG. 4 is yet another side-elevational of the preferred embodiment with the bobber positioned against the bobber stop and the weighted fishing hook end of a fishing line extended downwards therefrom in a position for fishing.

The same reference numerals refer to the same parts through the various Figures.

DESCRIPTION OF THE PREFERRED EMBODIMENT

Figure 1:
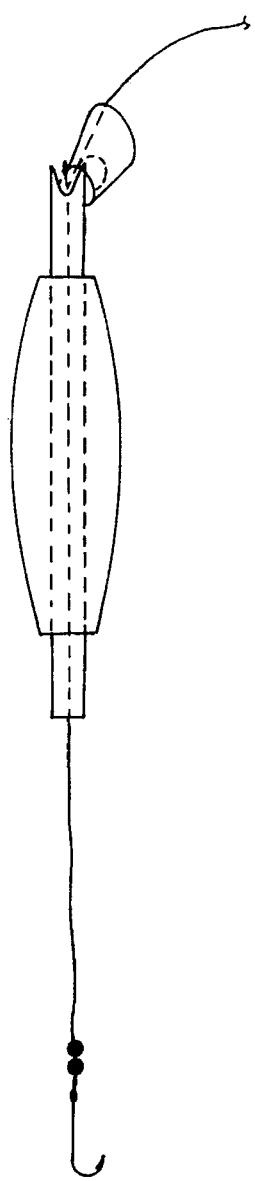
FIG. 1 is a side-elevational view of a prior art adjustable depth fishing float.
Figure 2:
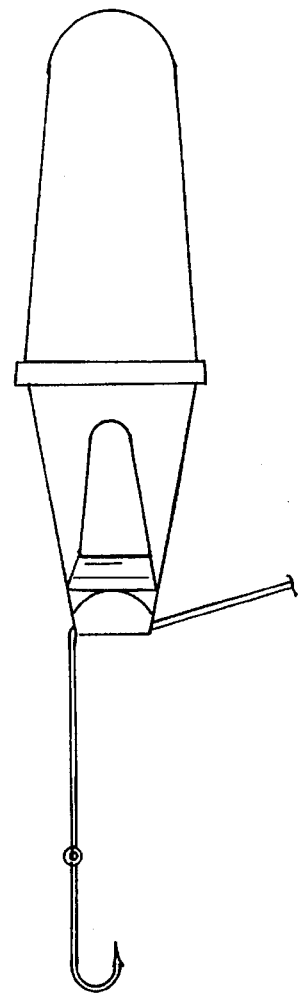
FIG. 2 is a side-elevational view of a prior art casting bobber.
Figure 5:
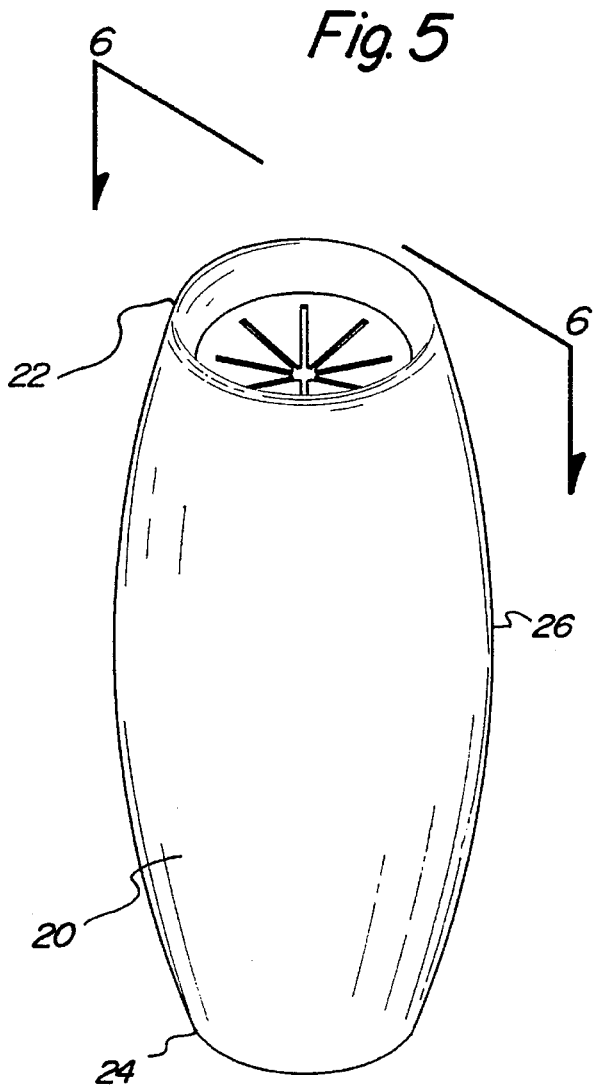
FIG. 5 is a perspective view of the bobber and the trap of the present invention.
Figure 6:
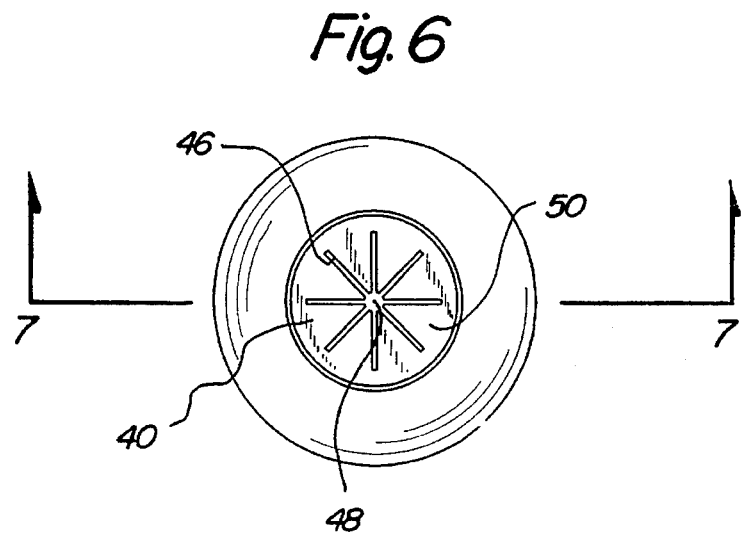
FIG. 6 is a view of the present invention taken along the line 6—6 of FIG. 5.
Figure 7:
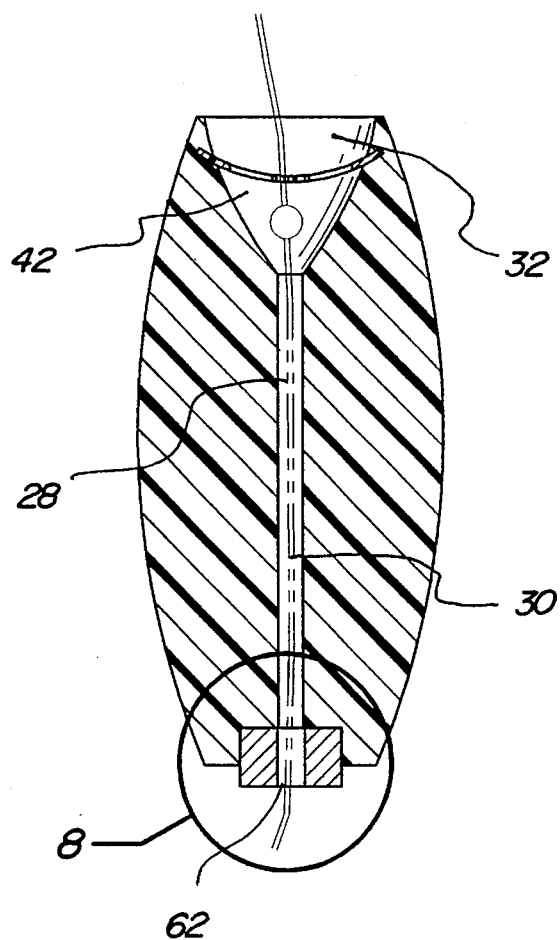
FIG. 7 is a cross-sectional view of the present invention taken along the line 7—7 of FIG. 6.
Figure 8:
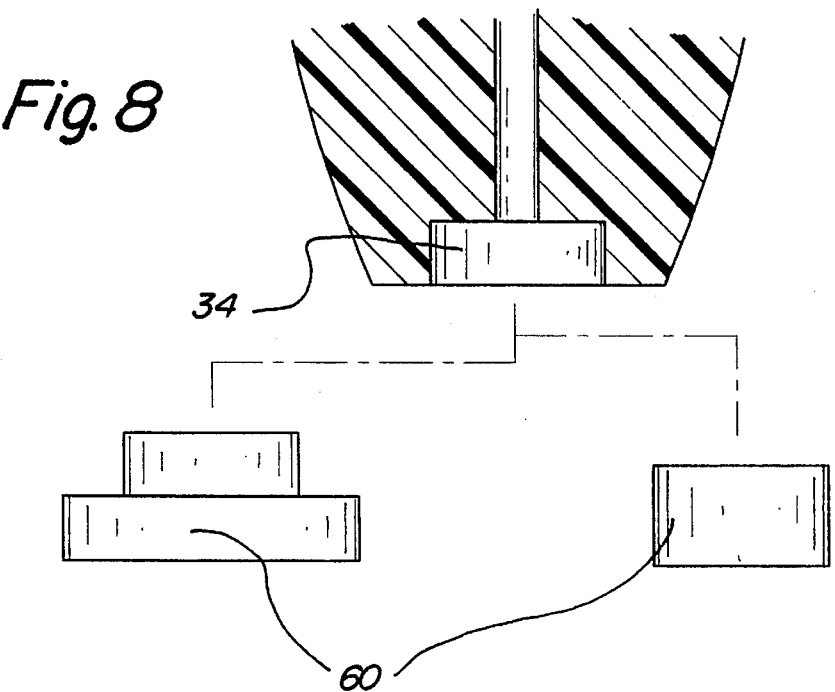
FIG. 8 is an enlarged cross-sectional view of the bottom end of the bobber depicting the adjustable securement of different casting weights thereto for affecting the casting distance of the weighted fishing hook end of the fishing line.

With reference now to the drawings, and in particular, to FIGS. 3 through 8 thereof, the preferred embodiment of the new and improved adjustable depth fishing bobber system embodying the principles and concepts of the present invention and generally designated by the reference number 10 will be described.

Specifically, the present invention includes four major components. The major components are the bobber stop, bobber, trap, and casting weights. These components are interrelated to provide the intended function.

The first major component is the bobber stop 12. The bobber stop is formed of a malleable metal or other similar material. The bobber stop is generally spherical in structure with a closeable notch formed thereon for receiving a fishing line therein. The bobber stop is removably coupled to a fishing line having a weighted fishing hook end 14 and a user end. The user end of the fishing line is connected to a reel of a fishing pole and actuated by a fisherman.

The second major component is the bobber 20. The bobber is formed of styrofoam or other similar floatable material. The bobber has a top end 22, a bottom end 24, and a concave exterior surface 26 extended therearound between the top end and bottom end. The concave exterior portion allows smooth travelling of the bobber across the water, thereby generating a minimum of ripples so as not to scare fish. The bobber also has an axial bore 28 disposed therethrough from the top end to the bottom end. The bore is adapted to receive a fishing line therein. The bore has a cylindrical central section 30. The central section has an upper end, a lower end, and a diametric extent less than the bobber stop. The bore also has a conical upper section 32. The upper section is extended upwards and outwards from the upper end of the central section to the top end of the bobber. Lastly, the bore has a lower section 34. The lower section has a diametric extent greater than the central section and is extended downwards from the lower end of the central section to the bottom end of the bobber.

The third major component is the trap 40. The trap is generally curved in structure. It is formed of a circular sheet of flexible plastic material. The trap is secured across the upper section 32 of the bore and thereby defines a holding space 42. The holding space is located between the trap and the upper end of central section of the bore. The trap has a plurality of slits 46 formed therethrough in a central spoked configuration. This spoked configuration of slits thereby defines an opening 48 generally blocked with a plurality of radial bendable gripping fingers 50.

The fourth major component is the casting weights 60. The present invention includes a plurality of casting weights. The casting weights are formed of lead or plastic. Each casting weight has a characteristic weight. Each casting weight also has a bore 62 disposed therethrough. Each casting weight is removably and frictionally securable within the lower section of the bore of the bobber. One casting weight at a time is secured within the lower section of the bore of the bobber for providing additional weight. However, a casting weight need not be utilized to place the present invention into operation.

To operate the present invention, the bobber stop is coupled to a fishing line. The fishing line is then extended through the bore of the bobber, through the opening of the trap, and, optionally, through the bore of the casting weight coupled to the bobber. A fishing hook with sinkers or other weight means is then secured to the end of the fishing line remote from a reel or pole to define a weighted fishing hook end. Thus, in an operable configuration the weighted fishing hook end is located below the bottom end of the bobber and the bobber stop is located above the top end of the bobber. To cast the weighted fishing hook end, the bobber is slidably positioned thereagainst. Once casted, the weighted fishing hook end is further setable for fishing at a predetermined depth within the body of water. Once the weighted fishing hook end is cast upon the body of water, it proceeds to sink. The bobber, however, floats upon the surface of the body of water. The fishing hook end sinks until the bobber stop passes through the trap. The gripping fingers are flexible enough to allow the bobber stop to proceed therethrough. The bobber stop then enters the holding space and its movement is then halted, because it cannot proceed through the central section of the bore due to its smaller radial extent. Now, the bobber stop is generally secured within the holding space. Due to the curved structure of the trap's fingers, the bobber stop cannot easily be pulled out of the holding space. The radial positioning of the slits in combination with the conical shape of the upper section of the bore allows the angular orientation of the line to be adjusted without inadvertently pulling the bobber stop out of the holding space. Thus, the fishing line may be held taut for monitoring bobber movements that depict strikes of feeding fish upon the weighted fishing hook end. The fishing line may be reeled in from the user end thereof with the bobber stop remaining intact within the holding space. To release the bobber from the bobber stop, a fisherman first axially aligns the fishing line near the top end of the bobber with the bore and then applies a downward pressure to the bobber. The released bobber then slides back down the fishing line to the weighted fishing hook end in a position for casting.

The present invention is used in conjunction with sinkers positioned next to a baited hook on an end of a fishing line. The bobber stop is coupled to the fishing line between the user end and weighted fishing hook end for controlling the depth at which the bait is dangle. The present invention moves to the end of the fishing line adjacent to the hook or sinkers for casting. Thus, all the weight is placed at the end of the fishing line for an improved and better controlled cast. Once the baited hook is cast upon the water, the sinkers near the hook pull the fishing line down into the water through the floating bobber until the bobber stop is pulled within the trap. The fingers of the trap then secure the bobber stop within the holding space to arrest any movement of the bobber back down the fishing line. Furthermore, when the fishing line is reeled in, the bobber remains coupled with the bobber stop and with the baited hook still held under the water, even in turbulent waters or when trolling behind a moving boat. The bobber of the present invention is made of styrofoam which is formed into any shapes that are suited for fishing. A plurality of interchangeable weights are included and couplable to the bottom of the bobber for controlling casting distance and accuracy. A bore extends through the length of the bobber, permitting it to slide easily along the fishing line when secured therearound. The arrangement controls the configuration at the end of the fishing line while allowing the weighted bobber to assist in the casting process. Casts are more accurate and longer. The configuration of the bore of the present invention allows a fishing line to be extended and retracted from the bobber in a smooth linear motion instead of a circular rotating motion caused by prior art bobber systems that are fixedly coupled to a fishing line at a location farther up from the weighted fishing hook end.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An adjustable depth fishing bobber system for use with a fishing line having a user end and a weighted fishing hook end for allowing the weighted fishing hook end to be readily casted and then set at a predetermined depth within a body of water for fishing comprising, in combination:

a generally spherical bobber stop removably couplable to a fishing line;

a bobber formed of styrofoam having a top end, a bottom end, a concave exterior surface extended therearound between the top end and bottom end, an axial bore disposed therethrough from the top end to the bottom end with the bore further having a cylindrical central section having an upper end, a lower end, and a diametric extent less than the bobber stop, a conical upper section extended upwards and outwards from the upper end of the central section to the top end, and a lower section having a diametric extent greater than the central section extended downwards from the lower end of the central section to the bottom end;

a generally curved trap formed of a circular sheet of flexible plastic material with the trap secured across the upper section of the bore and thereby defining a holding space between the trap and the upper end of the central section of the bore, the trap having a plurality of slits formed therethrough in a spoked configuration thereby defining an opening generally blocked with plurality of radial bendable gripping fingers; and a plurality of casting weights formed of lead, each casting weight having a characteristic weight and a bore disposed therethrough, each casting weight removably and frictionally securable within the lower section of the bore of the bobber and with not more than one of the casting weights at a time secured within the lower section of the bore of the bobber;

whereby when the bobber stop is coupled to a fishing line between the user end and the weighted fishing hook end thereof, and when the fishing line is extended through the bore of the bobber and through the opening of the trap and through the bore of casting weight such that the weighted fishing hook end is positioned below the bottom end of the bobber and the bobber stop is positioned above the top end of the bobber, the weighted fishing hook end is castable towards a body of water when the bobber is slidably positioned thereagainst, and once cast thereupon, the weighted fishing hook is further setable for fishing at a predetermined depth within the body of water by sinking until the bobber stop is disposed within the holding space of the floating bobber and generally secured therein with the gripping fingers of the trap.

2. An adjustable depth fishing bobber system comprising:

a bobber stop removably couplable to a fishing line between a user end and weighted fishing hook end thereof;

a floatable bobber having a top end, a bottom end, a bore disposed therethrough from the top end to the bottom end with the bore further having a central section having an upper end, a lower end, and a diametric extent less than the bobber stop, an upper section extended upwards and outwards from the upper end of the central section to the top end, and a lower section having a diametric extent greater than the central section extended downwards from the lower end of the central section to the bottom end; and a trap formed of a sheet of flexible material secured across the upper section of the bore thereby defining a holding space between the trap and the upper end of the central section of the bore and having a plurality of slits formed therethrough in a spoked configuration thereby defining an opening generally blocked with plurality of bendable gripping fingers;

whereby when the bobber stop is coupled to a fishing line between the user end and the weighted fishing hook end thereof, and when the fishing line is extended through the bore of the bobber and through the opening of the trap such that the weighted fishing hook end is located below the bottom end of the bobber and the bobber stop is located above the top end of the bobber, the weighted fishing hook end is castable towards a body of water when the bobber is positioned thereagainst, and once cast thereupon, the weighted fishing hook is further setable for fishing at a predetermined depth within the body of water by sinking until the bobber stop is disposed within the holding space of the floating bobber and generally secured therein with the gripping fingers of the trap.

3. The adjustable depth fishing bobber system as set forth in claim 2 further including a plurality of casting weights with each casting weight having a characteristic weight and with the casting weights securable within the lower section of the bore of the bobber.

* * * * *